United States Patent
Bowler et al.

(10) Patent No.: US 8,930,927 B2
(45) Date of Patent: Jan. 6, 2015

(54) DIAGNOSING ALIASING VIOLATIONS IN A PARTIAL PROGRAM VIEW

(75) Inventors: Christopher Eugene Bowler, Markham (CA); Sean Douglas Perry, Toronto (CA); Ettore Tiotto, Markham (CA)

(73) Assignee: International Business Machines Corporation, Armonk, NY (US)

(*) Notice: Subject to any disclaimer, the term of this patent is extended or adjusted under 35 U.S.C. 154(b) by 1402 days.

(21) Appl. No.: 12/337,939

(22) Filed: Dec. 18, 2008

(65) Prior Publication Data

US 2010/0162219 A1    Jun. 24, 2010

(51) Int. Cl.
*G06F 9/45* (2006.01)
*G06F 11/36* (2006.01)

(52) U.S. Cl.
CPC .............. *G06F 11/366* (2013.01); *G06F 8/434* (2013.01)
USPC ............................ 717/154; 717/140; 717/151

(58) Field of Classification Search
None
See application file for complete search history.

(56) References Cited

U.S. PATENT DOCUMENTS

| | | | | |
|---|---|---|---|---|
| 5,175,856 A * | 12/1992 | Van Dyke et al. | ............ | 717/151 |
| 5,293,629 A * | 3/1994 | Conley et al. | .................. | 717/154 |
| 5,581,762 A * | 12/1996 | Hayashi et al. | ............... | 717/144 |
| 5,583,988 A * | 12/1996 | Crank et al. | .................... | 714/48 |
| 5,768,596 A * | 6/1998 | Chow et al. | .................... | 717/154 |
| 5,778,212 A * | 7/1998 | Dehnert et al. | ............... | 717/155 |
| 6,014,518 A * | 1/2000 | Steensgaard | .................. | 717/154 |
| 6,041,179 A * | 3/2000 | Bacon et al. | ................... | 717/151 |
| 6,072,950 A * | 6/2000 | Steensgaard | .................. | 717/126 |
| 6,131,189 A * | 10/2000 | Chow et al. | .................... | 717/151 |
| 6,202,202 B1 * | 3/2001 | Steensgaard | .................. | 717/127 |
| 6,230,314 B1 * | 5/2001 | Sweeney et al. | ............... | 717/154 |
| 6,487,713 B1 * | 11/2002 | Cohen et al. | .................... | 717/105 |
| 6,665,865 B1 * | 12/2003 | Ruf | ................. | 717/157 |
| 6,718,542 B1 * | 4/2004 | Kosche et al. | ................ | 717/151 |
| 6,880,154 B2 * | 4/2005 | Ghosh et al. | .................. | 717/151 |
| 6,986,126 B2 * | 1/2006 | Kosche et al. | ................ | 717/126 |
| 7,493,607 B2 | 2/2009 | Moritz | | |
| 7,516,448 B1 * | 4/2009 | Chan et al. | .................... | 717/155 |
| 7,555,748 B2 | 6/2009 | Archambault et al. | | |
| 7,617,496 B2 | 11/2009 | Gonion | | |
| 7,752,613 B2 * | 7/2010 | Guo et al. | ...................... | 717/153 |
| 7,757,225 B2 * | 7/2010 | Copeland et al. | ............. | 717/163 |
| 8,006,239 B2 * | 8/2011 | Sankaranarayanan et al. | ............................ | 717/154 |

(Continued)

OTHER PUBLICATIONS

Amer Diwan et al., "Using Types to Analyse and Optimize Object-Oriented Programs", ACM, 2001, <http://scholarworks.umass.edu/cgi/viewcontent.cgi?article=1008&context=cs_faculty_pubs> pp. 1-42.*

(Continued)

*Primary Examiner* — Thuy Dao
*Assistant Examiner* — Samuel Hayim
(74) *Attorney, Agent, or Firm* — Yee & Associates, P.C.; William Stock (57) ABSTRACT

A compiler generated static analysis of potential aliasing violations in a portion of code that is not in the current program view of the analysis. Source code in a current program view of the program code is processed to collect symbol definitions. The possible destinations of each symbol definition are computed. The set of symbol definitions in the current program view of the code that are accessible to the portion of the program code outside the current program view is evaluated. Each symbol definition is diagnosed based on the type of the symbol defined and the symbols which may be pointed-to by the symbol definitions.

17 Claims, 3 Drawing Sheets

(56) References Cited

U.S. PATENT DOCUMENTS

| | | | |
|---|---|---|---|
| 8,185,881 B2* | 5/2012 | Brand et al. | 717/132 |
| 2002/0129343 A1* | 9/2002 | Pinter et al. | 717/140 |
| 2003/0126590 A1* | 7/2003 | Burrows et al. | 717/154 |
| 2003/0167462 A1* | 9/2003 | Harrison et al. | 717/154 |
| 2004/0010782 A1* | 1/2004 | Moritz | 717/151 |
| 2004/0015902 A1* | 1/2004 | Kosche et al. | 717/141 |
| 2004/0205740 A1 | 10/2004 | Lavery et al. | |
| 2005/0183072 A1* | 8/2005 | Horning et al. | 717/140 |
| 2005/0204348 A1* | 9/2005 | Horning et al. | 717/140 |
| 2006/0004996 A1* | 1/2006 | Gonion | 712/241 |
| 2006/0048103 A1 | 3/2006 | Archambault et al. | |
| 2008/0134159 A1* | 6/2008 | Guo et al. | 717/154 |
| 2008/0301657 A1 | 12/2008 | Bowler et al. | |
| 2009/0271763 A1* | 10/2009 | Varma et al. | 717/114 |
| 2011/0035733 A1 | 2/2011 | Horning et al. | |

OTHER PUBLICATIONS

Michael Hind, "Pointer Analysis: Haven't We Solved This Problem Yet?", ACM, 2001, <http://www.cs.cornell.edu/courses/cs711/2005fa/papers/hind-paste01.pdf>, pp. 1-8.*

Jehak Woo et al., "Flow-Sensitive Alias Analysis with Referred-Set Representation for Java", IEEE, 2000, <http://ieeexplore.ieee.org/stamp/stamp.jsp?tp=&arnumber=846603>. pp. 1-10.*

N. Rinetzky et al., "On the Complexity of Partially-Flow-Sensitive Alias Analysis", ACM, 2008, <http://delivery.acm.org/10.1145/1360000/1353447/a13-rinetzky.pdf, pp. 1-28.*

Dhurjati et al., "Enforcing Alias Analysis for Weakly Typed Languages", Computer Science Dept., University of Illinois, Nov. 2005, pp. 1-23.

Liu et al., "UML-based Alias Control", Rensselaer Polytechnic Institute, Sep. 2006, pp. 1-12.

GCC 4.1 Release Series Changes, New Features, and Fixes, retrieved Apr. 10, 2008, pp. 1-10. http://gcc.gnu.org/gcc-4.1/changes.html.

Xue et al., "Interprocedural Side-Effect Analysis for Incomplete Object-Oriented Software Modules", Journal of Systems and Software, vol. 80, Issue 1, Elsevier Science Inc. New York, NY, USA, Jan. 2007, pp. 92-105.

Xue, et al., "Completeness Analysis for Incomplete Object-Oriented Programs", Lecture Notes in Computer Science, vol. 3443, Springer-Verlag Berlin Heidelberg, 2005, pp. 271-286.

Notice of Allowance issued on Aug. 14, 2012 for U.S. Appl. No. 11/757,952, 6 pages.

Office Action issued on Mar. 30, 2012 for U.S. Appl. No. 11/757,952, 11 pages.

Avots et al., "Improving Software Security with a C Pointer Analysis," Proceedings of the 27th International Conference on Software Engineering (ICSE '05), May 2005, pp. 332-341.

Diwan et al., "Type-Based Alias Analysis," Proceedings of the ACM SIGPLAN Conference on Programing Language Design and Implementation, Jun. 1998, pp. 106-117.

Goldberg et al., "Software Bubbles: Using Predication to Compensate for Aliasing in Software Pipelines," Proceedings of the 2002 International Conference on Parallel Architectures and Compilation Techniques (PACT '02), Sep. 2002, pp. 211-221.

Hummel et al., "A Language for Conveying the Aliasing Properties of Dynamic, Pointer-Based Data Structures," Proceedings of the Eighth International Parallel Processing Symposium, Apr. 1994, pp. 208-216.

Livshits et al., "Tracking Pointers with Path and Context Sensitivity for Bug Detection in C Programs," Proceedings of the 9th European Software Engineering Conference held jointly with 11th ACM SIGSOF International Symposium on Foundations of Software Engineering (ESEC/FSE '03), Sep. 2003, pp. 317-326.

Marlowe et al., "Hybrid Incremental Alias Algorithms," Proceedings of the 24th Annual Hawaii International Conference on System Sciences, Jan. 1991, vol. 2, pp. 428-437.

Martin et al., "Finding Application Errors and Security Flaws Using PQL: a Program Query Language," Proceedings of the 20th Annual ACM SIGPLAN Conference on Object-Oriented Programming, Systems, Languages, and Applications (OOPSLA '05), Oct. 2005, pp. 365-383.

Palsberg, "Type-Based Analysis and Applications," Proceedings of the 2001 ACM SIGPLAN-SIGSOFT Workshop on Program Analysis for Software Tools and Engineering (PASTE 01), Jun. 2001, pp. 20-27.

Richardson et al., "Code Optimization Across Procedures," Compture, vol. 22, No. 2, Feb. 1989, pp. 42-50.

Woo et al., "Alias Analysis on Type Inference for Class Hierarchy in Java," Proceedings of the 24th Australasian Computer Science Conference (ACSC 2001), Jan.-Feb. 2001, pp. 206-214.

Fernandez et al., "Speculative Alias Analysis for Executable Code," Proceedings of the 2002 International Conference on Parallel Architectures and Compliation Techniques (PACT '02), Sep. 2002, pp. 222-231.

Office Action, dated Mar. 7, 2014, regarding U.S. Appl. No. 11/757,952, 11 pages.

Notice of Allowance, dated May 9, 2014, regarding U.S. Appl. No. 11/757,952, 5 pages.

* cited by examiner

DIAGNOSING ALIASING VIOLATIONS IN A PARTIAL PROGRAM VIEW

CROSS REFERENCE TO RELATED APPLICATIONS

This application is related to U.S. application Ser. No. 11/757,952 filed Jun. 4, 2007, and entitled "Method of Diagnosing Alias Violations in Memory Access Commands in Source Code," incorporated by reference herein for all purposes.

BACKGROUND

1. Field of the Invention

The present invention relates generally to optimizing the performance of software code in a compiler, and more specifically, to a method of detecting potential violations of aliasing rules during the static analysis of source code.

2. Description of the Related Art

It is important that programmers follow existing type-based aliasing rules when coding programs. Type-based aliasing rules define alias sets for indirect memory accesses in a program. For example, there may be two pointers declared in a C/C++ program. Assume the first pointer, int* p1, is an integer pointer, and the second pointer, float* p2, is a float pointer. The type-based aliasing rules would prohibit p1 and p2 from pointing to the same memory location. Now assume the program contains a dereference of the integer pointer p1, and that p1 points to a float variable. This dereference would constitute a violation of the type-based aliasing rules for the program. During optimization, compilers may operate based on the assumption that the type-based aliasing rules were followed by the programmer. The compiler may, for example, interchange two store instruction assignment (*p1=3 and *p2=1.0f) by assuming that the two assignments cannot possibly modify the same memory location.

If the programmer violates the type-based aliasing rules, the compiler assumption may be invalid, and the program may be optimized incorrectly. Incorrectly optimized programs often produce unexpected results at runtime, and it may be extremely challenging to find the source of a failure, especially one that may be the result of a programmer error that causes an invalid compiler optimization.

In a related application Ser. No. 11/757,952, filed Jun. 4, 2007, and entitled "Method of Diagnosing Alias Violations In Memory Access Commands In Source Code," incorporated herein for all purposes, all the symbol assignments and types are traced in a program. A diagnostic may be provided at the point of the symbol dereference that outlines why the symbol dereference may be dangerous and flags a symbol that may be pointing to a memory location with the wrong type. The tracing and diagnostic results may only be fully effective if the compiler can analyze all files and procedures that are part of the program.

However, in applications that include multiple program files or compilation units, it may not be possible to analyze the entire program because the compiler may not have access to all the program source code.

BRIEF SUMMARY

This disclosure describes an innovative static analysis method of diagnosing potential aliasing violations in software code that may include multiple compilation units in source code that is accessible to a compiler in the current program view and source code that is not accessible to a compiler outside the current program view.

According to a disclosed class of innovative embodiments, there is disclosed a computer-implemented method of optimizing a source code program. The method includes identifying a set of symbols with assigned definitions wherein the set of symbol definitions may be referenced outside the current program view, receiving a set of aliasing rules for the source code, identifying potential aliasing errors, based on the set of aliasing rules, that may occur outside the current program view, and generating diagnostic messages for the set of symbol definitions based on the identified potential aliasing errors.

According to a disclosed class of innovative embodiments, there is disclosed a computer program product including a computer recordable storage medium tangible embodying program code, which when executed, performs the computer-implemented method of identifying a set of symbols with assigned definitions, wherein the set of symbols may be referenced outside a current program view available to the compiler, receiving a set of aliasing rules for the source code, identifying potential aliasing errors, based on the set of aliasing rules, that may occur outside the current program view, and generating diagnostic messages for the set of symbol definitions based on the identified potential aliasing errors.

According to another disclosed class of innovative embodiments, there is disclosed a data processing system that optimizes source code during a static analysis. The system comprises a processor that receives source code, a compiler that processes the source code input to the processor, a memory system coupled to the processor, the memory comprising programming instructions executable by the processor. The memory includes instructions to identify a set of symbols with assigned definitions, wherein the set of symbols may be referenced outside a current program view available to the compiler, instructions to receive a set of aliasing rules for the source code, instructions to identify potential aliasing errors, based on the set of aliasing rules, that may occur in a portion of the source code outside the current program view, and instructions to generate diagnostic messages for the set of symbol definitions based on the identified potential aliasing errors.

The embodiments of the disclosed processes provide the advantage of statically checking source code in compilation units that are not directly accessible to the compiler and are outside the current program view of the compiler. Symbol definitions that may lead to potential optimization errors of source code outside the current view of the compiler may be flagged for review by a user.

These and other advantages will be more clearly understood from the following detailed description taken in conjunction with the accompanying drawing and claims.

DETAILED DESCRIPTION

The present disclosure is described below with reference to flowchart illustrations and may include one or more block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product embodied in any tangible medium of expression having computer usable program code embodied in the medium. The present disclosure should in no way be limited to the illustrative implementations, drawings and techniques described herein, but may be modified within the scope of the appended claims along with their full scope of equivalents.

In embodiments of this disclosure, a diagnostic process run during static compilation identifies symbols that may be dereferenced incorrectly in a portion of a program that is outside the current program view of the compiler. An incorrect dereference may potentially cause an error during the execution of the optimized program if not corrected. The diagnostic process includes a first analysis that provides information about the possible values of symbol definitions. In this disclosure, a symbol is defined by assigning a value to a representation. For example, p=1 is a symbol definition; "p" represents a symbol and "1" defines a value assigned to the symbol representation. In another example, p=2 is a symbol definition; "p" represents a symbol and "2" defines a value assigned to the symbol representation. A symbol may be accessed from a portion of the program that is immediately accessible to the compiler or some other location that is not immediately visible to the compiler or outside the current program view. A second analysis provides information about which symbol definitions escape the current view of the program. To one skilled in the art, this is recognized as reaching definition analysis of those definitions, which may reach an instruction, which may branch to a program location outside the current compiler view of the program. The diagnostic process uses the information from the first and second analyses to generate information to a user.

Figure 1:
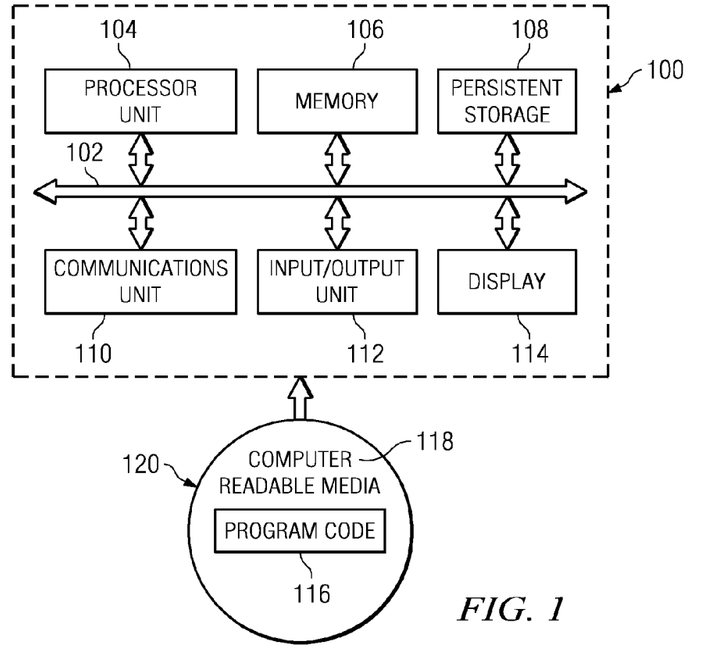
FIG. 1 is a block diagram of an exemplary software environment that may be operable for various embodiments of the disclosure.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one embodiment, computer readable media 118 may exist in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, or transmission-type media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
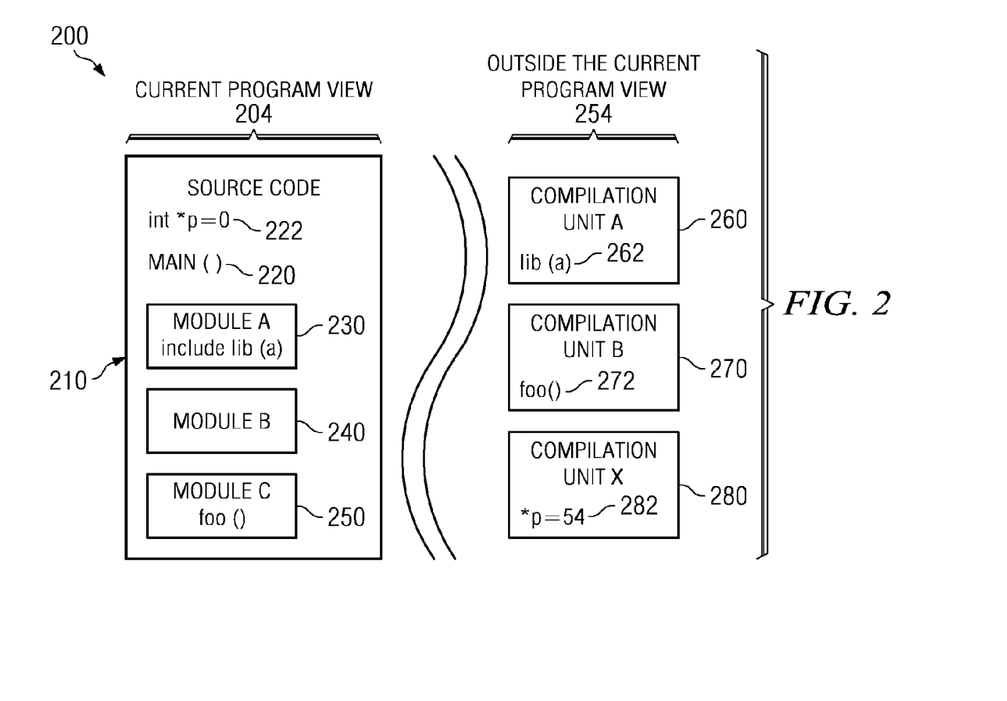
FIG. 2 is a diagram that graphically illustrates how program code may be characterized by a compiler according to one embodiment of the disclosure.

FIG. 2 graphically illustrates in diagram 200 a compiler view of program code according to one embodiment. Program code may contain source code 210 that may be written in a programming language such as C, C++, or other programming language known to one skilled in the art. Source code 210 may be comprised of one or more distinct physical source files, or modules, in one main code section or compilation unit. A compiler may perform operations on the program symbols that are directly referenced in source code 210 starting with the main code section 220 in one or more compilation units that are accessible or within the current program view of the compiler. Source code 210, for example, is within the current program view 204 and may include source code from different modules, such as module A 230, module B 240, and a module C. 220. Source code 210 may also contain indirect references to external links and shared libraries that are not directly accessible to the compiler and are therefore not within the current program view 204 of the compiler. The indirect references may exist in a region of the source code that outside the current program view 254 of the compiler. The portion of the program outside the current program view 254 may include, but is not limited to, one or more shared libraries, one or more static libraries, functions, and compilation units. For example, the portion of the program outside the current program view 254 may include external compilation units, such a compilation unit A 260, compilation unit B 270 and compilation unit X 280. The portion of the program outside the current program view 254 may also include one or more shared libraries, such as shared library 262, and one or more functions such as function 272.

In an exemplary embodiment, a global pointer variable of type integer, denoted as int *p 222 may be declared in the current program view 204 as part of source code file 210. As a global program variable, int *p 222 may be dereferenced in a compilation unit, function, or other code that may exist in a portion of the program outside the current program view 254 outside of the current program view 204. For example, int *p 222 may be dereferenced in compilation unit 280, and the value 54 assigned to the memory location pointed to by p using program statement *p=54 282.

Figure 3:
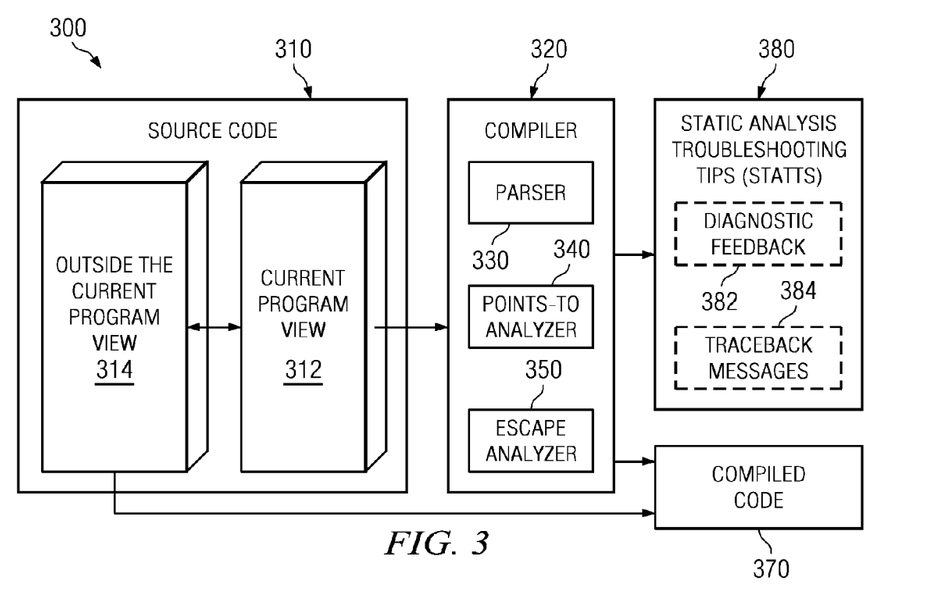
FIG. 3 illustrates an operational model according to an embodiment of the disclosure.

Referring now to FIG. 3, a top level operational flow 300 is illustrated in accordance with one embodiment of the invention. A static analysis operation may be performed on code in a source file 310. The source code 310 may include program code in one or more compilation units in a current program view 312. The source code 310 may also include program code in compilation units that outside the current program view 314. The current program view 312 of source code 310 may also branch, directly or indirectly, to a portion of the source code 310 that may be outside the current program view 314. In one embodiment, the static analysis operation commences with the parsing of the source code 310 in the current program view 312 by a compiler 320. The current program view 312 of source code 310 may reference or branch to data outside the current program view 312. During compilation by compiler 320, information may be transferred within the current program view 312 and between the current program view 312 and outside the current program view 314.

In some embodiments, the source code that is outside the current program view 314 may be source code that is compiled independently from source code within the current program view 312. The source code outside the current program view that is independently compiled may be incorporated by or input directly to compiled code 370.

It must be emphasized that the source code outside the current program view 314 that may be referenced by the current program view 312 is not accessible by the compiler 320. For example, there may be a call to a function foo in the current program view 312. The function foo may be defined outside the current program view 314. The compiler 320 may recognize the existence of function foo because it is called in the current program view 312. However, the compiler 320 will not be able to access the definition of function foo because it exists outside the current program view 314.

The compiler 320 may enable a parser 330 or some other suitable routine to detect and collect any symbol declarations and review the statements and assignments in the program. Compiler 320 may perform a points-to analysis for each symbol using a points-to analyzer 340. The results obtained by the points-to analyzer 340 provide information about the possible memory locations and underlining declared types which may be pointed to by a symbol. One of ordinary skill in the art may recognize that various levels of point-to analyzer algorithms are known to exist in the art. In one embodiment a context and flow insensitive points-to analysis is performed by the points-to analyzer 340. The compiler 320 may be configured to select an application specific points-to analysis routine that may range from an from ordinary, coarse points-to analysis algorithm that may yield less precise results to a technically sophisticated point-to analysis algorithm that produces more precise results.

Escape analyzer 350 of compiler 320 may perform an escape analysis to determine which symbol definitions may be referenced, directly or indirectly, by a portion of the program outside the current program view. A symbol escapes the current program view 312 if it may be accessed, directly or indirectly by a portion of the program outside the current program view. For example, a symbol may escape the current program view 312 if it is has external linkage or if it is a member of a data structure which has external linkage. An instruction is said to escape if it may branch to a location outside the current program view. For example, a function defined in the current program view may be determined to include an instruction that causes the program control to escape the current program view if said instruction causes a branch to the definition of a function defined in a compilation unit outside the current program view. Similarly, an indirect function may cause the program control to escape the current program view if one of its possible targets is defined outside the current program view. A function return expression may be determined to escape the current program view if the enclosing function has external linkage. A symbol definition is said to escape the current program view if the defined symbol escapes the current program view and there exists an execution path from the definition point to an escape instruction on which no other definition of the same symbol occurs.

The compiler 320 may not be able to immediately access portions of programs that are linked in on the link step, such as functions or procedures defined in a library. Other program portions outside the current program view may include code in libraries that are linked in at runtime, or functions that may be defined in another compilation unit, or defined in objects compiled by a different compiler. Code that is outside the current program view may also include compiled code that is part of another compilation unit. Other possible conditions that may result in code that is outside the current program view would be obvious to one skilled in the art.

In one embodiment, exemplary pseudo-code for an escape analyzer algorithm may be expressed as provided in Table 1, inset below.

TABLE 1

1. Initialize $s_{escaped}$ to the empty set: { }
2. For each program symbol $s_{external}$ with external linkage, add $s_{external}$ to $s_{escaped}$
3. For each function parameter symbol $s_{parameter}$ belonging to a function with external linkage not defined in the current compilation unit, add $s_{parameter}$ to $s_{escaped}$ TABLE 1-continued 4. For each function return symbol $s_{return}$ belonging to a function with external linkage, add $s_{return}$ to $s_{escaped}$
5. Complete $s_{escaped}$ by performing:
   Define evaluateAddressTakenSymbol(symbol s) {
       for each escaping symbol definition of s where
       the definition is an address-taken symbol $s_{prop}$:
           if ($s_{prop}$ does not belong to $s_{escaped}$) {
               augment $s_{escaped}$ with $s_{prop}$
               evaluateAddressTakenSymbol($s_{prop}$)
           }
       }
   For each symbol s in $s_{escaped}$:
       evaluateAddressTakenSymbol(s)

With respect to the exemplary pseudo-code of Table 1, an address-taken symbol may be determined to escape if the address of the symbol is stored into a symbol that escapes the current program view of the source program and the definition of the stored symbol reaches an instruction that might cause the program control to escape the current program view of the source program. The escape analyzer may maintain a set of instructions, symbols, and symbol definitions that escape the current program view.

The compiler 320 uses the information provided by the points-to analyzer 340 and the escape analyzer 360 to diagnose which symbols that escape the current program view may be dereferenced outside the current program view and potentially lead to a violation of the aliasing rules in effect. The compiler 320 may output the location of the symbol definition(s) which may invalidate optimizations performed in portions of the program outside the current program view. The compiler may output static analysis troubleshooting tips (STATTS) 380 that may require a user to manually verify portions of program code that may potentially lead to an identified potential aliasing violation. The STATTS 380 may include diagnostic feedback 382. The diagnostic feedback 382 may specifically identify a location, such as a column and/or line number, in the source code that may contain a potential program error, and emit additional information to facilitate the manual correction of the program error by the user.

In some embodiments, the information may be output or printed to a graphical user interface (GUI). In other embodiments, the information may be output to a file, such as a source listing file or report file. A user may review the information output to the GUI or file. The STATTS 380 may also include traceback messages 384. The traceback messages 384 may use the point-to analysis information gathered by the compiler to generate a traceback sequence of source locations in the program code that corresponds to the potential error. The traceback sequence comprises a sequence of source locations, which if executed in that order, would result in a symbol pointing to a particular memory location having an underlined declared type which, according to the aliasing rules in effect, is incompatible with the symbol declared type. In addition, the compiler may also emit compiled code 370 that may be executed.

Figure 4:
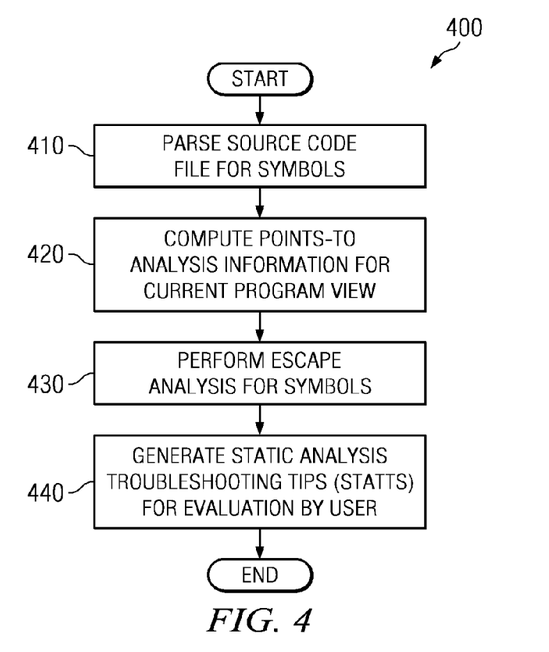
FIG. 4 is a top level flowchart detailing the design flow of the diagnostic process according to one embodiment of the current disclosure.

FIG. 4 illustrates a top level flow chart that details the operation of FIG. 3. A compiler reads source code to perform a static analysis operation. At a block 410, the source code that is accessible to a compiler may be parsed to collect symbols that are declared in the source code. At a block 420, a points-to analysis is computed for each symbol to determine the set of memory locations, and their declared types, that the symbol may indirectly reference. The portion of code that is outside the current program view of the compiler is not accessible. The program code that is outside the current program view may include, but is not limited to, portions of a program in a library compiled by different compiler or a library that is linked at runtime. At a block 430, the compiler may perform an escape analysis to determine which instructions, symbols and symbol definitions escape the current program view. The symbols with external linkage may include external functions. Other symbols having external linkage may be obvious to one skilled in the art.

At a block 440, troubleshooting tips may be output as a result of the static analysis performed by the compiler. The static analysis troubleshooting tips (STATTS) may include information about any symbol definition that escapes the current program view of the source program. Specifically, based on the information provided by the points-to analysis and the escape analysis, STATTS may also provide information to diagnose symbol or address-taken symbols that escape the current program view and may be dereferenced and therefore lead to an aliasing violation. The information may be in the form of a traceback sequence of messages. The information may also be formatted as diagnostic feedback that includes column and line location in the source code. STATTS may be output to a graphical user interface, a file, or some other output device that is user accessible.

Figure 5:
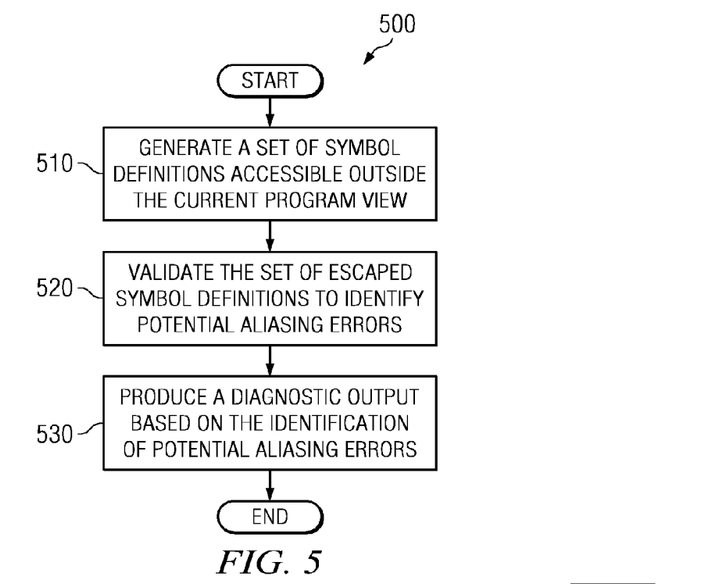
FIG. 5 is a more detailed flowchart of the processes outlined by the top level flowchart of FIG. 4.

FIG. 5 provides further details of the top level process of FIG. 4. At a block 510, a compiler may collect a set of symbol definitions from code that is in the current program view, and that may be referenced by code outside the current program view. At a block 520, a set of symbol definitions are validated to identify potential aliasing errors. At a block 530, a diagnostic output based on the identification of potential aliasing errors may be generated for a user to review. The user may review the diagnostic output to determine the validity of the potential aliasing errors. If a reported aliasing violation is determined by the user to be valid, the user may then correct the program source code.

The following examples illustrate various aspects of the disclosed process. In Table 2, inset below, a points-to analysis may provide information that a declared pointer p points to the address of s at line 6.

TABLE 2

```
1 int *p = 0; // global pointer variable
2 short s;
3 void foo(void); // definition not available in the current program
  view
4
5 int main( ) {
6   p = (int*)&s;
7   foo( );
8   return 0;
9 }
10
11 // function foo( ) is defined outside the current program view
12
13 void foo(void) {
14    int s = 54;
15    *p = 42;
16 }
```

Table 2 also declares a function foo at line 3 that contains a definition of p at line 6. The definition of p at line 6 reaches the call to function foo at line 7. The instruction at line 7 causes the program execution to branch to the definition of function foo at line 13, outside the current program view.

The variable p is declared as a global variable at line 1 and therefore escapes the current program view.

In the body of function foo, the instruction at line 15 causes memory location identified by *p to be updated with the value 42. The underlining type of expression *p used by the store instruction at line 15 is int, which may not be aliased with any variable of type short according to the standard C/C++ type-based aliasing rules. Therefore a diagnostic or STATT may then be emitted as shown in Table 2A.

TABLE 2A (I) 6.5: The stored value may point to "s" with type "short", which "p" with indirect type "int" is not aliased to.
(I) Check assignment at line 6 column 5.

Table 2A illustrates a diagnostic that provides information about a possible or potential problem in the program that may be manually checked by a user. In Table 2A shown above, the diagnostic message provides information about a problem that may exist because of the assignment at line 6, column 5 in the source code, and the potential reason for the problem. The message directs the user to check the reason for the problem which may exist in multiple places in the program, i.e., "Check assignment at line 6, column 5. The point-to information may be very complicated as to why a symbol may point to some symbol. This is communicated to the user via traceback messages.

When the points-to information and the escaped symbols sets exist, any symbol definition of an escaped symbol is evaluated. If an escaped symbol may point to a symbol that is not aliased to its declared type, a diagnostic is emitted. The diagnostic may include the coordinates in the source code and the names and types of the variables.

Table 3 represents source code that is being compiled to an executable program.

TABLE 3

```
1 int *p1 = 0;
2 int *p2 = 0;
3 int *p3 = 0;
4
5 void foo1(void) { }
6 void foo2(void);
7 void foo3(int* p);
8
9 int main( ) {
10   float f;
11   p1 = (int*)&f; // 1
12   foo1( );
13   p1 = 0;
14   p2 = (int*)&f; // 2
15   foo2( );
16   p2 = 0;
17   p3 = (int*)&f; // 3
18   p3 = 0;
19   foo2( );
20   foo3((int*)&f); // 4
21   return 0;
22 }
```

Three global pointers, p1, p2, and p3 are declared at lines 1-3 respectively, and are initialized to zero. Three functions foo1, foo2 and foo3 are declared at lines 5-7, respectively. Table 3 indicates at line 5 that foo1 is defined in the current program view, while foo2 and foo3, at lines 6 and 7, respectively, are only declared and will be defined outside the current program view.

The main section of the program ranges from lines 9-22. The main program declares the variable f as having type float. The address of f is assigned to p1 at line 11. The function foo1 is called at a line 12, foo 1 is defined in the current program view of the program. The symbol definition of p1 at line 11 does not escape the current program view because the store of 0 to p1 at line 13 instruction appears before the program control reaches an escaping instruction. Therefore, the definition of p1 at line 11 is not diagnosed because it does not escape the current program view.

At line 14, p2 is assigned the address of variable f. Function foo2 is called at line 15. A diagnostic is emitted for symbol definition at line 14 because that definition reaches the call to foo2 at line 15, and foo2 is defined outside the current program view. Another symbol definition is shown at a line 17. However, the symbol definition p3=0 at line 18 overwrites the symbol definition at line 17 before an escaping instruction is reached. Because the symbol definition at line 17 does not escape the current program view, it is not diagnosed.

The program contains a symbol definition of the parameter symbol p of foo3 at line 20. Because the definition of foo3 is outside the current program view and the declared type of p3 is not compatible with the declared type of &f, the compiler reports the potential problem.

The compiler will run the algorithm provided earlier in Table 1 to determine which of the symbol definitions need to be diagnosed. In the process of compiling the source code, the compiler may emit diagnostics against certain lines of the source code. It may emit a diagnostic that says that assignment in the source code at statement //2 at line 14 of Table 2 is potentially dangerous. It may also emit a second diagnostic that states that the assignment in the source code at statement //4 at line 20 of Table 2 is potentially dangerous.

Table 4 provides another embodiment of the disclosure.

TABLE 4

```
1 int i;
2
3 float* foo( ) {
4   return (float*)&i;
5 }
```

Table 4 depicts a return symbol for the function foo with external linkage that may be added to the escape symbol set. Table 4 demonstrates that because the return expression may branch to a source location outside the current program view, diagnostics should be emitted against line 4 because points-to analysis for the returned expression indicates it points-to i or has a value &i which may have an incompatible type according to the standard C/C++ type-based aliasing rules.

The diagnostic may take the form as illustrated in Table 4A, inset below.

TABLE 4A (I) 4.10: The stored value may point to "i" with type "int", which "the return of float* foo( )" with indirect type "float" is not aliased to.
(I) Check function return at line 4, column 10.

In another example, Table 5 illustrates that an assignment may be diagnosed because it is indirectly referenced.

TABLE 5

```
1 void foo( );
2 int **pp;
3
4 int main( ) {
5   float f;
6   int* p = (int*)&f;
7   pp = &p;
8   foo( );
9   return 0;
10 }
```

In Table 5, recursion is performed to collect all the escape symbols. A function foo is declared at line 1 for which no definition exists in the current program view. At line 2, a global pointer pp which foo can access is declared. At line 6 symbol f of type float has its address assigned to pointer p declared with type int*. At line 7, the address of p is assigned to the global pointer pp. Because pp can be referenced in the external function foo which is called at line 8, then indirectly the memory location associated with variable f can also be referenced in foo. Since the type of f and **pp are not aliased to each other (according to the standard C/C+ aliasing rules), the assignment at line 6 results in a diagnostic being generated. Table 5A depicts an example of a diagnostic that may be emitted as a result of Table 5.

TABLE 5A (I) 6.11: The stored value may point to "f" with type "float", which "p" with indirect type "int" is not aliased to.
(I) Check assignment at line 6, column 11.
(I) "p" was address-taken at line 7, column 8

Figure 6:
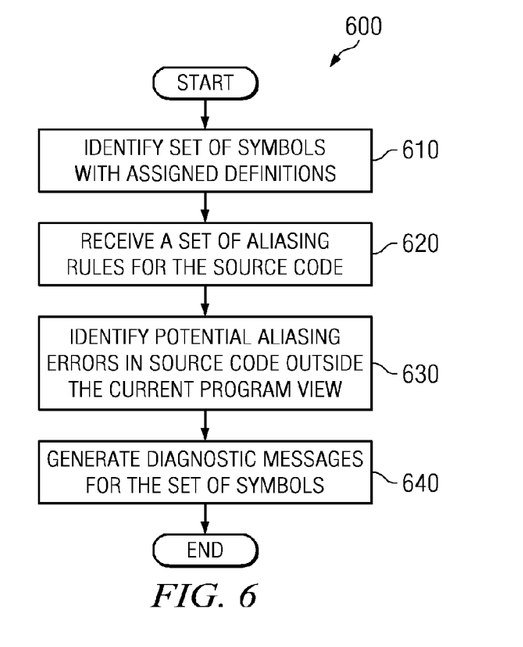
FIG. 6 is a flowchart that details the overall process according to an embodiment of the disclosure.

In FIG. 6, flowchart 600 summarizes the process of one embodiment of the disclosure previous detailed in the disclosure. At a block 610, a set of symbols in the source code with assigned definitions are identified. The source code is within a current program view or accessible by a compiler. The set of symbols may be referenced in source code outside the current program view of the compiler. At a block 620, a set of aliasing rules for the source code may be applied. The set of aliasing rules may be standard type-based aliasing rules that a programmer is required to follow. The aliasing rules may be activated by a command line switch option at compile time or may be an option in the source code.

At a block 630, the compiler may identify potential aliasing errors in the source code outside the current program view based on the set of aliasing rules. At a block 640, diagnostic messages may be generated that pinpoint the area in the code that includes the potential aliasing errors. The diagnostic messages may include diagnostic feedback and traceback messages that generate a traceback sequence of source locations in the source code.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product comprising a computer-usable or computer-readable medium tangibly embodying program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, semiconductor system, apparatus or device. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing a static analysis of a source code program, the method comprising:

identifying, by a data processing system in a current program view of a first source code module of the source code program compiled by a first compiler during a static compilation of the first source code module by the first compiler, a symbol with an assigned definition pointing to data of a first declared type located at a memory location, wherein the memory location is also referenced by another symbol in a second source code module of the source code program compiled by a second compiler outside the current program view available to the first compiler, and wherein the source code program comprises the first source code module and the second source code module, and wherein the data processing system displays the current program view;

receiving, by the data processing system, a set of type-based aliasing rules for indirect memory access for the source code program;

identifying, by the data processing system, a potential aliasing error, during the static compilation of the first source code module of the source code program, based on the set of type-based aliasing rules, that occurs in the second source code module of the source code program, wherein the identifying, by the data processing system, of the potential aliasing error includes identifying at least one symbol having a potential to cause an error during execution of the source code program by using the data at the memory location using an assigned definition of a different type than the first declared type;

determining, by the data processing system, that the assigned definition reaches an instruction that branches to the second source code module of the source code program;

identifying, by the data processing system, a location in the second source code module of the source code program compiled by the second compiler where the other symbol points to data of a second declared type at the memory location that is incompatible with the first declared type; and generating, by the data processing system, a diagnostic message for the symbol with the assigned definition based on the identified potential aliasing error, wherein at least one diagnostic message pinpoints an area in the second source code module of the source code program that includes the other symbol pointing to data of the second declared type, and wherein the second source code module outside the current program view comprises a set of shared libraries that is combined with the first source code module when the source code program is loaded into memory and executed by the data processing system.

2. The method of claim 1, wherein the identifying, by the data processing system, of the potential aliasing error comprises validating a set of symbol definitions against the set of type-based aliasing rules; and wherein the potential aliasing error comprises the at least one symbol being dereferenced incorrectly in a portion of the source code program that is outside the current program view of the second compiler.

3. The method of claim 1, wherein the receiving, by the data processing system, of the set of type-based aliasing rules comprises enabling the set of type-based aliasing rules by an option in a command line.

4. The method of claim 1, wherein the receiving, by the data processing system, of the set of type-based aliasing rules comprises enabling a manual option in the source code program.

5. The method of claim 1, wherein assigned definitions that are referenced in the second source code module outside the current program view are referenced indirectly.

6. The method of claim 1, wherein assigned definitions that are referenced in the second source code module outside the current program view are referenced directly.

7. The method of claim 1, wherein the determining, by the data processing system, that the assigned definition reaches the instruction that branches to the second source code module of the source code program comprises performing a reaching definition analysis.

8. The method of claim 1, wherein a plurality of instructions in the current program view of the first source code module branches to the second source code module outside the current program view.

9. The method of claim 1, wherein the determining, by the data processing system, that the assigned definition reaches the instruction that branches to the second source code module of the source code program comprises:
   parsing, by the data processing system, the second source code module;
   identifying, by the data processing system, assignments to symbols in the second source code module; and
   computing, by the data processing system, a points-to information for each symbol in the second source code module.

10. The method of claim 1, wherein the generating, by the data processing system, of the diagnostic message comprises:
    generating, by the data processing system, a traceback sequence of information of the identified potential aliasing error; and
    outputting, by the data processing system, the traceback sequence.

11. The method of claim 10, further comprising:
    detecting, by the data processing system, a violation of a type-based aliasing rule.

12. The method of claim 2, wherein the validating of the set of symbol definitions against the set of type-based aliasing rules comprises:
    computing, by the data processing system, a points-to information for each symbol definition in the source code program.

13. A computer program product for performing a static analysis of a source code program, the computer program product comprising:
    one or more computer readable storage devices;
    program instructions stored on at least one computer readable storage device for identifying, in a current program view of a first source code module of the source code program compiled by a first compiler during a static compilation of the first source code module by the first compiler, a symbol with an assigned definition pointing to data of a first declared type located at a memory location, wherein the memory location is also referenced by another symbol in a second source code module of the source code program compiled by a second compiler outside the current program view available to the first compiler, and wherein the source code program comprises the first source code module and the second source code module, and wherein a data processing system displays the current program view;
    program instructions stored on at least one computer readable storage device for receiving a set of type-based aliasing rules for indirect memory access for the source code program;
    program instructions stored on at least one computer readable storage device for identifying a potential aliasing error, during the static compilation of the first source code module of the source code program, based on the set of type-based aliasing rules, that occurs in the second source code module of the source code program, wherein the identifying of the potential aliasing error includes identifying at least one symbol having a potential to cause an error during execution of the source code program by using the data at the memory location using an assigned definition of a different type than the first declared type;
    program instructions stored on at least one computer readable storage device for determining that the assigned definition reaches an instruction that branches to the second source code module of the source code program;
    program instructions stored on at least one computer readable storage device for identifying a location in the second source code module of the source code program compiled by the second compiler where the other symbol points to data of a second declared type at the memory location that is incompatible with the first declared type; and
    program instructions stored on at least one computer readable storage device for generating a diagnostic message for the symbol with the assigned definition based on the identified potential aliasing error, wherein at least one diagnostic message pinpoints an area in the second source code module of the source code program that includes the other symbol pointing to data of the second declared type, and wherein the second source code module outside the current program view comprises a set of shared libraries that is combined with the first source code module when the source code program is loaded into memory and executed by the data processing system.

14. A data processing system for performing a static analysis of a source code program, the data processing system comprising:
    one or more processors that receive the source code program;
    one or more computer readable storage devices;
    one or more memories communicatively coupled to the one or more processors;
    instructions stored on at least one computer readable storage device for execution by at least one processor via at least one memory for identifying, in a current program view of a first source code module of the source code program compiled by a first compiler during a static compilation of the first source code module by the first compiler, a symbol with an assigned definition pointing to data of a first declared type located at a memory location, wherein the memory location is also referenced by another symbol in a second source code module of the source code program compiled by a second compiler outside the current program view available to the first compiler, and wherein the source code program comprises the first source code module and the second source code module, and wherein the data processing system displays the current program view;

instructions stored on at least one computer readable storage device for execution by at least one processor via at least one memory for receiving a set of type-based aliasing rules for indirect memory access for the source code program;

instructions stored on at least one computer readable storage device for execution by at least one processor via at least one memory for identifying a potential aliasing error, during the static compilation of the first source code module of the source code program, based on the set of type-based aliasing rules, that occurs in the second source code module of the source code program, wherein the identifying of the potential aliasing error includes identifying at least one symbol having a potential to cause an error during execution of the source code program by using the data at the memory location using an assigned definition of a different type than the first declared type;

instructions stored on at least one computer readable storage device for execution by at least one processor via at least one memory for determining that the assigned definition reaches an instruction that branches to the second source code module of the source code program;

instructions stored on at least one computer readable storage device for execution by at least one processor via at least one memory for identifying a location in the second source code module of the source code program compiled by the second compiler where the other symbol points to data of a second declared type at the memory location that is incompatible with the first declared type; and instructions stored on at least one computer readable storage device for execution by at least one processor via at least one memory for generating a diagnostic message for the symbol with the assigned definition based on the identified potential aliasing error, wherein at least one diagnostic message pinpoints an area in the second source code module of the source code program that includes the other symbol pointing to data of the second declared type, and wherein the second source code module outside the current program view comprises a set of shared libraries that is combined with the first source code module when the source code program is loaded into memory and executed by the data processing system.

15. The computer program product of claim 13, wherein the identified potential aliasing error comprises the at least one symbol being dereferenced incorrectly in a portion of the source code program that is outside the current program view of the second compiler.

16. The computer program product of claim 13, wherein at least one diagnostic message specifically identifies a location containing the at least one symbol and a sequence of source locations, which if executed in an order of the sequence, result in the at least one symbol pointing to a particular memory location having an underlined declared type that is incompatible with a declared type of the at least one symbol.

17. The data processing system of claim 14, wherein the identified potential aliasing error comprises the at least one symbol being dereferenced incorrectly in a portion of the source code program that is outside the current program view of the second compiler.

* * * * *